(12) United States Patent
Hanson (10) Patent No.: US 10,190,297 B2
(45) Date of Patent: *Jan. 29, 2019

(54) MOBILE SINK ASSEMBLY (71) Applicant: Smart Sinks Pty Ltd, Queensland (AU)

(72) Inventor: Craig Hanson, Queensland (AU)

(73) Assignee: SMART SINKS PTY LTD., Queensland (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/378,556

(22) Filed: Dec. 14, 2016

(65) Prior Publication Data

US 2017/0175369 A1   Jun. 22, 2017

(30) Foreign Application Priority Data

Dec. 17, 2015 (AU) .................... 2015271918

(51) Int. Cl.
| | |
|---|---|
| *A47K 1/04* | (2006.01) |
| *E03C 1/264* | (2006.01) |
| *B01D 29/13* | (2006.01) |
| *B01D 29/50* | (2006.01) |
| *B01D 35/157* | (2006.01) |
| *B01D 35/26* | (2006.01) |
| *E03C 1/186* | (2006.01) |
| *E03C 1/32* | (2006.01) |
| *E03C 1/18* | (2006.01) |

(52) U.S. Cl.
CPC ............... *E03C 1/264* (2013.01); *A47K 1/04* (2013.01); *B01D 29/13* (2013.01); *B01D 29/50* (2013.01); *B01D 35/1573* (2013.01); *B01D 35/26* (2013.01); *E03C 1/186* (2013.01); *E03C 1/32* (2013.01); *B01D 2201/265* (2013.01); *B01D 2201/48* (2013.01); *E03C 1/18* (2013.01)

(58) Field of Classification Search
CPC .................................. E03C 1/264; A47K 1/04
USPC ............................................... 4/641, 619–653
See application file for complete search history.

(56) References Cited

U.S. PATENT DOCUMENTS

| | | | | |
|---|---|---|---|---|
| 2,071,160 A | * | 2/1937 | Boosey ..................... | E03F 5/16 210/532.1 |
| 3,613,131 A | * | 10/1971 | Stram et al. ........... | A61C 17/14 4/263 |
| 4,268,392 A | * | 5/1981 | Hayes ..................... | E03C 1/264 210/238 |
| 5,661,857 A | * | 9/1997 | McLean ................... | A47K 1/04 4/580 |

(Continued)

*Primary Examiner* — Christine Skubinna
(74) *Attorney, Agent, or Firm* — Wegman, Hessler & Vanderburg (57) ABSTRACT

The present invention is directed to a mobile sink assembly including a container partitioned into two compartments with an overflow aperture in a dividing wall providing fluid communication between an upper compartment and a lower compartment. There is a first trap in the top opening of the upper compartment and a second trap positionable below the first trap. There is a riser and valve assembly coupled to the draining aperture in the first trap and configured to control a flow of liquid from the first trap. There is a pump that pumps fluid from the lower compartment to the first trap. In this way water recirculates through the traps while particulate matter is retained in the first and second traps.

16 Claims, 10 Drawing Sheets

(56) References Cited

U.S. PATENT DOCUMENTS

| | | | | |
|---|---|---|---|---|
| 6,016,818 A | * | 1/2000 | Evaro | B08B 3/006 |
| | | | | 134/111 |
| 6,017,462 A | * | 1/2000 | Rains | B01D 21/0003 |
| | | | | 210/801 |
| 6,173,458 B1 | * | 1/2001 | Maddux | A47K 1/02 |
| | | | | 4/619 |
| 2006/0275083 A1 | * | 12/2006 | Wimberger | E03F 1/00 |
| | | | | 405/40 |
| 2014/0338655 A1 | * | 11/2014 | Doyle | B60P 3/0257 |
| | | | | 126/276 |

* cited by examiner

MOBILE SINK ASSEMBLY

CROSS REFERENCE TO RELATED APPLICATION

This application claims the priority filing benefit of Australian Patent Application No. AU 2015271918 filed Dec. 17, 2015.

FIELD OF INVENTION

The present invention relates to mobile apparatus for cleaning devices and tools and trapping particulate waste. The present invention has particular but not exclusive application for cleaning tools and equipment of trades' people. Reference to cleaning of tools and equipment will be made in the specification by way of example of the invention but the invention is not limited to this example.

BACKGROUND OF THE INVENTION

Tools and equipment on a work site often become contaminated or dirty with particulate matter and can no longer be used for their intended purpose. In these situations, the worker must clean their tools and equipment so they can be reused. To clean their tools which requires the worker to take the tools off site to clean them. This is an inconvenience and consequently there is a reduced amount of time spent working.

If the tools and equipment are cleaned on-site, the consequent waste must be picked up and disposed of. If tools and equipment are cleaned using water from a tap or hose, the surrounding area becomes contaminated with waste. A further level of complexity is introduced where the resulting waste is toxic or environmentally harmful.

There are specific sinks designed to capture particulate waste such as the sink assembly described in Australian innovation patent AU2014100713. In this patent specification there is disclosed a sink that traps the particulate matter for proper disposal at a later time. The described sink is part of a working bench with plumbed connections to mains water and storm water drains.

The disadvantage associated with the described sink assembly is that it is not easily accessible or convenient for those workers working outdoors or away from convenient sink type facilities.

OBJECT OF THE INVENTION

It is one object of the present invention to provide a mobile particulate trapping assembly and system that overcomes at least in one part or more abovementioned problems.

SUMMARY OF THE INVENTION

In one aspect the invention broadly resides in a mobile sink assembly including a container with one or more wheels, said container is partitioned into two compartments with an overflow aperture in a dividing wall providing fluid communication between an upper compartment and a lower compartment;

a first trap supported adjacent a top opening in the upper compartment, said first trap has a draining aperture;

a second trap positionable below the first trap and in fluid communication with the first trap via the draining aperture;

a riser and valve assembly coupled to the draining aperture in the first trap and configured to control a flow of liquid from the first trap, the height of an opening in the riser and valve assembly is lower than the height of the top of the first trap to allow fluid to pass through the riser and valve rather than overflow the first trap; and a pump operatively connected to pump fluid from the lower compartment to the first trap; wherein in use fluid is pumped from the lower compartment to the first trap, passes through the draining aperture into the second trap and from the second trap via the overflow aperture to return to the lower compartment, while particulate matter is retained in the first and second traps.

The first trap is preferably supported by a rail or a lip that at least partially surrounds an outer perimeter of the first trap. Alternatively there can be a plurality of lugs surrounding the outer perimeter of the first trap. The rail, lip or lugs are preferably positioned on a ledge, channel or protrusion on the inner surface of the upper compartment.

The top of the first trap is preferably positioned in use below the top of the container. More preferably there are one or more discharge apertures on or near the top of the first trap where an overflow of fluid can discharge into the upper compartment. Alternately in one embodiment there is a gap between the first trap and the walls of the compartment which allows fluid to pass through into the space below the first trap.

The first trap is preferably substantially square in shape to fit within the top opening of the upper compartment of the container.

The draining aperture is preferably positioned in the floor of the first trap.

The second trap can be of any suitable shape and in one preferred embodiment is substantially square in shape.

The riser and valve assembly preferably includes a mushroom valve positioned within the draining aperture. The mushroom valve is preferably configured to actuate between a sealed position and an unsealed position, wherein in the sealed position the draining aperture is sealed to prevent draining of fluid from the first trap through to the second trap.

In a further form, the riser and valve assembly includes a valve biaser. The valve biaser is preferably coupled to the mushroom valve and adapted to bias the mushroom valve towards the sealed position.

In a further form, the mushroom valve is preferably adapted to be actuated to the unsealed position by the valve actuator of the riser.

In a further form, the riser preferably removably couples to the valve assembly by a bayonet coupling.

In a preferred form there is a third trap that in use is positioned to surround the second trap. In a preferred embodiment the third trap is substantially rectangular in shape.

Preferably one or more of the traps are preferably lined with a filter bag that collects the particulate waste. Each of the traps are preferably lined with a filter bag that collects the particulate waste for disposal at a later date.

Preferably there is a disposable filter bag positionable in the one or more of the traps.

Preferably a disposable filter bag can be positioned within the first trap to collect settled particulate matter.

Preferably a disposable filter bag can be positioned within the second trap to collect settled particulate matter.

Preferably a disposable filter bag can be positioned within the third trap to collect settled particulate matter.

The fluid is preferably water or a cleaning solution.

The lower compartment preferably holds fluid that is pumped by the pump. In one embodiment, the lower compartment has a separate storage tank for holding the fluid. More preferably the fluid is stored in the lower compartment.

The pump is preferably housed within the lower compartment. In this embodiment the pump is preferably a submersible pump.

Preferably the pump is electrically operated. The pump can be operated by mains power, solar power and or via a mounted battery. The pump can be manually operated as a bilge pump.

The pump preferably has a hose that extends from the pump to the first trap. The hose can have a nozzle arrangement at an end remote from the pump. Preferably the nozzle arrangement can provide the discharge of fluid at various speeds and stream types. The nozzle arrangement preferably includes a tap or valve to shut-off fluid flow.

The fluid can optionally be filtered prior to its discharge from the hose. In a preferred embodiment, the fluid is filtered while being pumped from the lower compartment to the first trap. More preferably the fluid is filtered to remove particulate matter using sieve filters with particular pore sizes. The sieve filters can be any suitable filters such as sand, clay or paper cartridge filters.

The container is preferably a rectangular 'wheelie-bin" type container with an axle and two spaced apart wheels.

The container preferably has a lid.

The mobile sink assembly can preferably be used to clean and wash tools and equipment. The mobile sink assembly is particularly useful where water facilities are not available and the particulate waste is toxic, poisonous or not biodegradable.

The mobile sink assembly is particularly useful to wash and clean tools and equipment of plasterers, tilers, concreters, renderers, painters, core hole drillers, concrete cutters, floor grinders, pet groomers, bakers, spray painters, art studios, laboratories, and areas of food preparation and hospitality.

In one form, the mobile sink assembly preferably includes a work platform. The work platform is preferably located adjacent the top of the container. In one preferment, the work platform is attachable to the mobile sink assembly to provide support and a substantially continuous working surface.

In another aspect, the invention broadly resides in a mobile sink assembly including a container with one or more wheels, said container is partitioned into two compartments with an overflow aperture in a dividing wall providing fluid communication between an upper compartment and a lower compartment;

a first trap supported adjacent a top opening in the upper compartment, said first trap has a draining aperture in the floor of the first trap and one or more discharge apertures in one or more of the walls of the upper compartment;

a second trap positionable below the first trap and in fluid communication with the first trap via the draining aperture;

a riser and valve assembly coupled to the draining aperture in the first trap and configured to control a flow of liquid from the first trap, the height of an opening in the riser and valve assembly is lower than the height of the top of the first trap to allow fluid to pass through the riser and valve rather than overflow the first trap;

a third trap that houses the second trap within the third trap; and a pump in the lower compartment that is operatively connected to pump fluid from the lower compartment to the first trap; wherein in use fluid is pumped from the lower compartment to the first trap, passes through the draining aperture into the second trap and from the second trap via the overflow aperture to return to the lower compartment, while particulate matter is retained in the first and second traps.

The above aspects, variations, and options are to be understood as comprisable within the invention singly or in combination with each other.

BRIEF DESCRIPTION OF THE DRAWINGS

In order that the present invention can be more readily understood, reference will now be made to the accompanying drawings which illustrate preferred embodiments of the invention and wherein.

DETAILED DESCRIPTION OF PREFERRED EMBODIMENTS

With reference to the figures, there is shown a mobile sink assembly 10 comprising a base 11 and lid 12 hinged to base 11. The mobile sink assembly 10 has a pair of wheels 13 mounted to the base 11.

The mobile sink assembly 10 has a dividing wall 15 separating the base 11 into an upper compartment 16 and lower compartment 17. The dividing wall 15 has an overflow aperture 18 through which water or fluid can pass from the upper compartment 16 to the lower compartment 17. The lower compartment 17 also houses an electric pump 20 that can be submersed beneath the water. The electric pump is capable of pumping water via hoses 21 from the lower compartment 17 to the upper compartment 16. The electric pump 20 is operated by mains power obtained through an electrical connection outlet 23. In an alternate embodiment, electrical power is provided by a battery which is attached to or housed within the mobile sink assembly.

In the upper compartment 16, there is a first trap 30 that is substantially square in shape and can be positioned slightly below the top of the opening in the upper compartment 16. With the current embodiment there is a gutter 31 that surrounds the outside perimeter of the first trap 30. The gutter 31 allows the first trap 30 to rest on a corresponding rail 33 surrounding the inside surface of the upper compartment 16. The gutter 31 also allows the first trap 30 to be lifted out of the upper compartment 16. There are handles (not shown) that are on the inside of the first trap 30 which can be used to lift the first trap 30 from the upper compartment 16.

The first trap 30 also has a drainage aperture 35 in the floor 38. There is a riser and valve assembly 36 positioned within the drainage aperture 35. The rise and valve assembly 36 has a height that is lower than the height of the walls 37 of the first trap 30. The rise and valve assembly 36 allows water to pass through the valve and into a second trap 40 that is positioned beneath the first trap 30. The opening in the riser and valve assembly 36 is above the floor 38 of the first trap 30 so that water and particular matter collects in the first trap 30 and only when the water reaches a particular predetermined height does it then pass through the rise and valve assembly 36 into the second trap 40.

The second trap 40 has a greater depth than the first trap 30. The first trap 30 serves as a basin to wash tools and equipment and trap particulate matter. The second trap 40 serves to capture and trap residual particulate matter. As the particulate matter accumulates, the height of the water and particulate matter in the second trap 40 also rises. As the water in the second trap 40 rises, the riser in the valve assembly 36 also rises and at a predetermined height closes the valve so that no further water passes through the riser and valve assembly 36.

The water continues to rise in the first trap 30 if the valve of the riser and valve assembly 36 is closed. This rise of water in the first trap 30 is an indication that the second trap 40 and first trap 30 need to be cleaned out and the particulate matter removed. When the water rises in the first trap 30 it can flow over the top into the gutter 31 and then into the lower traps 40,50. This serves as a visual trigger to empty the disposal bags with the particulate matter in the first trap 30.

When the waste particulates rise to a predetermined level, the valve in the riser and valve assembly 36 closes. Any further water passing into the second trap 40 continues to collect and eventually overflows into the substantially rectangular third trap 50 within which the second trap 40 is positioned. There are apertures near the top of the walls in the second and third traps 40, 50 that allow overflow water to pass there-through. The third trap 50 is approximately the same depth or slightly larger than the depth of the second trap 40 but also is longer in order to accommodate the substantially square second trap 40. In the third trap 50, water and particulate matter can accumulate and if it rises to a height that overflows the walls of the third trap 50, the water and particulate matter pass into the upper compartment 16.

The second trap 40 is positioned within the third trap 50 guided by locating lugs (not shown). The third trap 50 is positioned within the upper compartment 16 by locating protrusion 60.

In use, water or a suitable cleaning solution fills the lower compartment 17 and submersible pump 20, pumps the water or cleaning solution through hoses 21 that extend from the pump 20 to a nozzle and tap arrangement 62. Water or solution is pumped from the pump 20 to the paper filter cartridges/sand filters 71 and then to the nozzle and tap arrangement 62.

The pump 20 is operated with power from a mains power supply that enters the mobile sink assembly 10 via the electrical outlet 23. The nozzle and tap arrangement 62 can be turned off and on at its position adjacent the opening of the upper compartment 16 and first trap 30.

In the preferred embodiment, disposable filter bags 39, 49 and 59 are used in the first trap 30, second trap 40 and third trap 50 respectively. The disposable filter bags 39, 49 and 59 provide a quick and convenient solution to collect the settled particulate matter and dispose of it appropriately without the need for further manual handling.

In another embodiment oil absorbent material is positioned on the dividing wall 15 in the upper chamber 16 and or in one or more of traps 50, 60 to absorb oils, greases and other nonpolar chemicals while allowing water and other polar chemicals to pass there-through. The absorbent material can also be used as a mat or work space on which the mobile sink assembly can be positioned.

Figure 1:
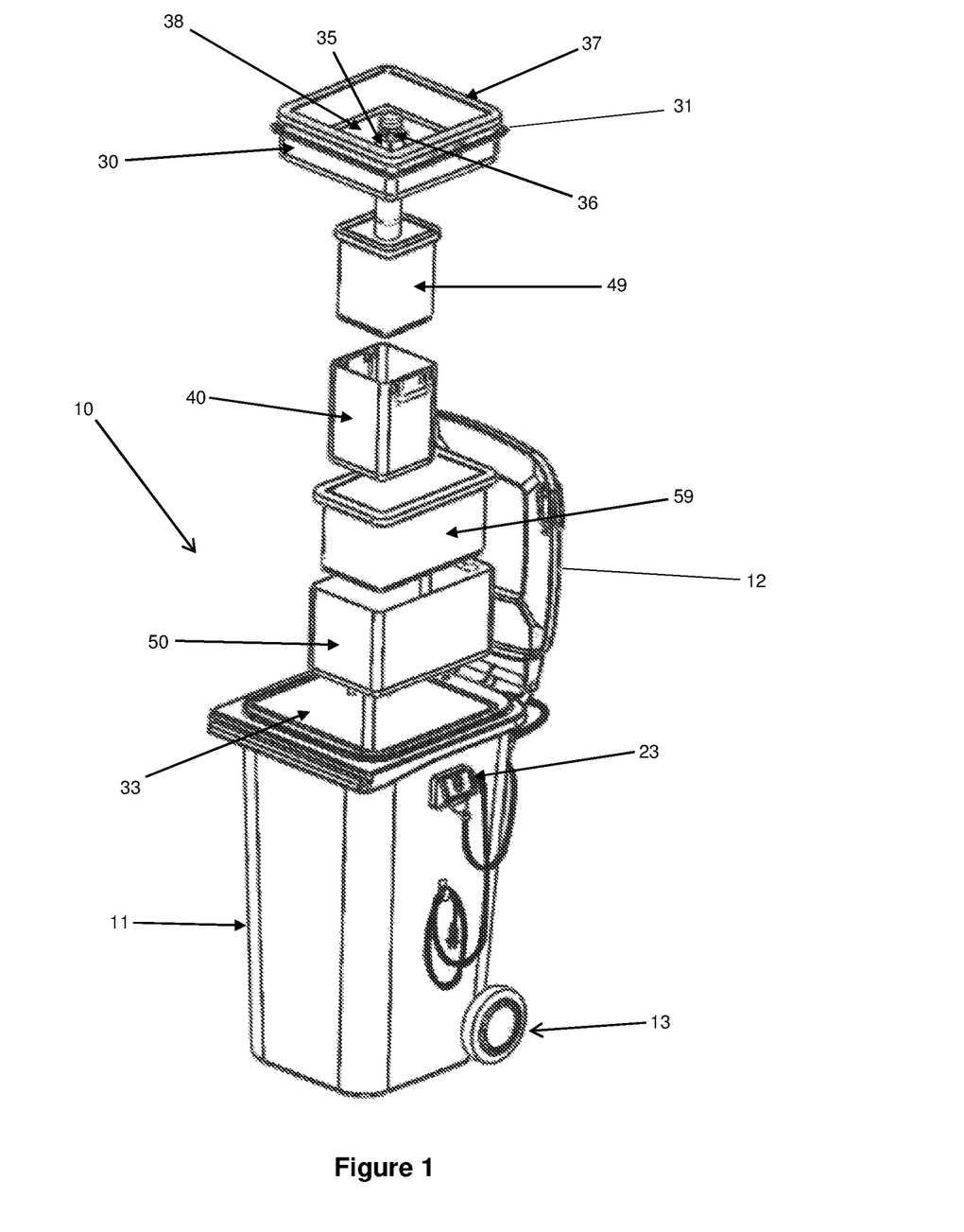
FIG. 1 is a diagrammatic exploded view of the mobile sink assembly of the preferred embodiment.
Figure 2:
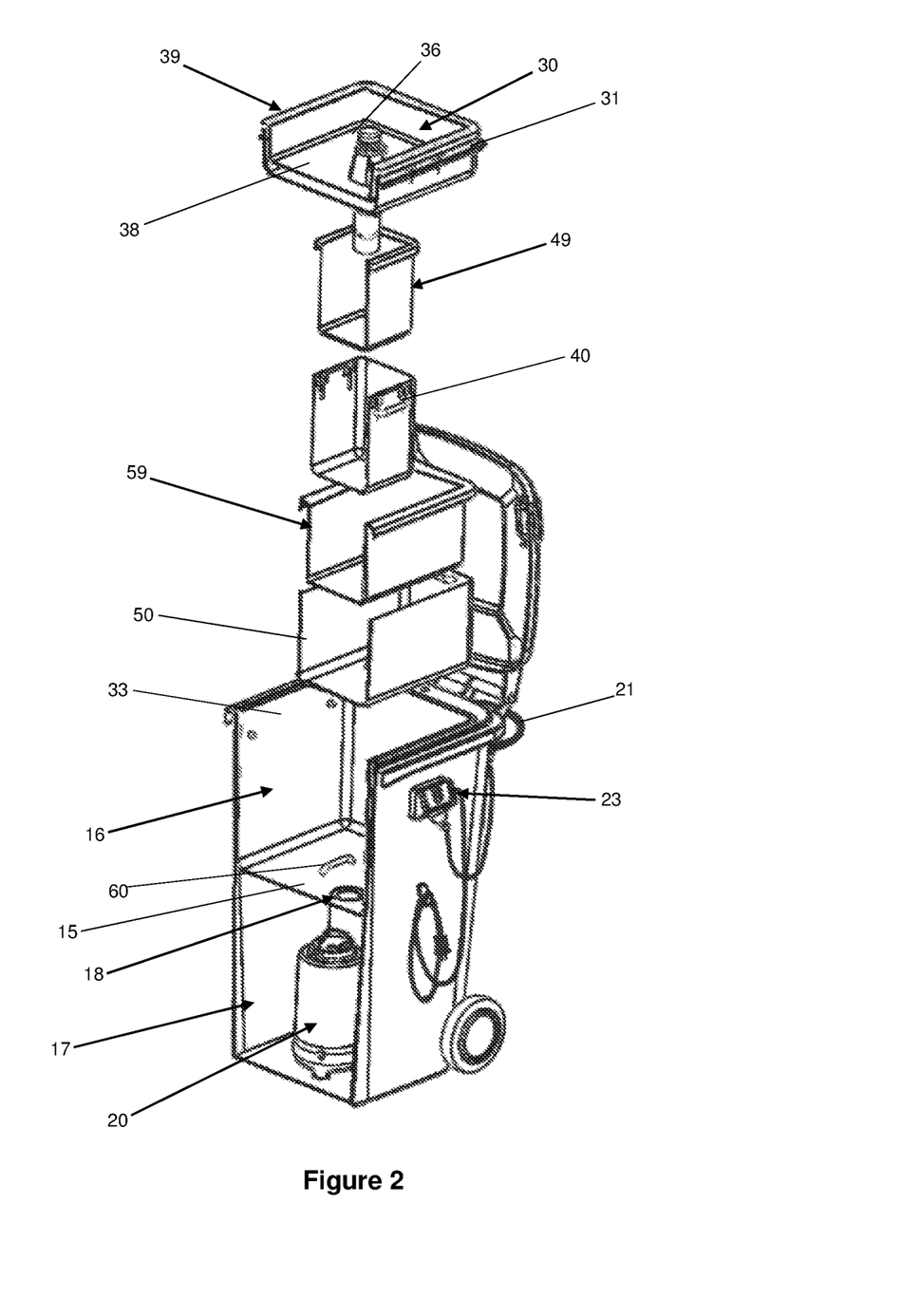
FIG. 2 is a diagrammatic cut-away exploded view of the mobile sink assembly.
Figure 3:
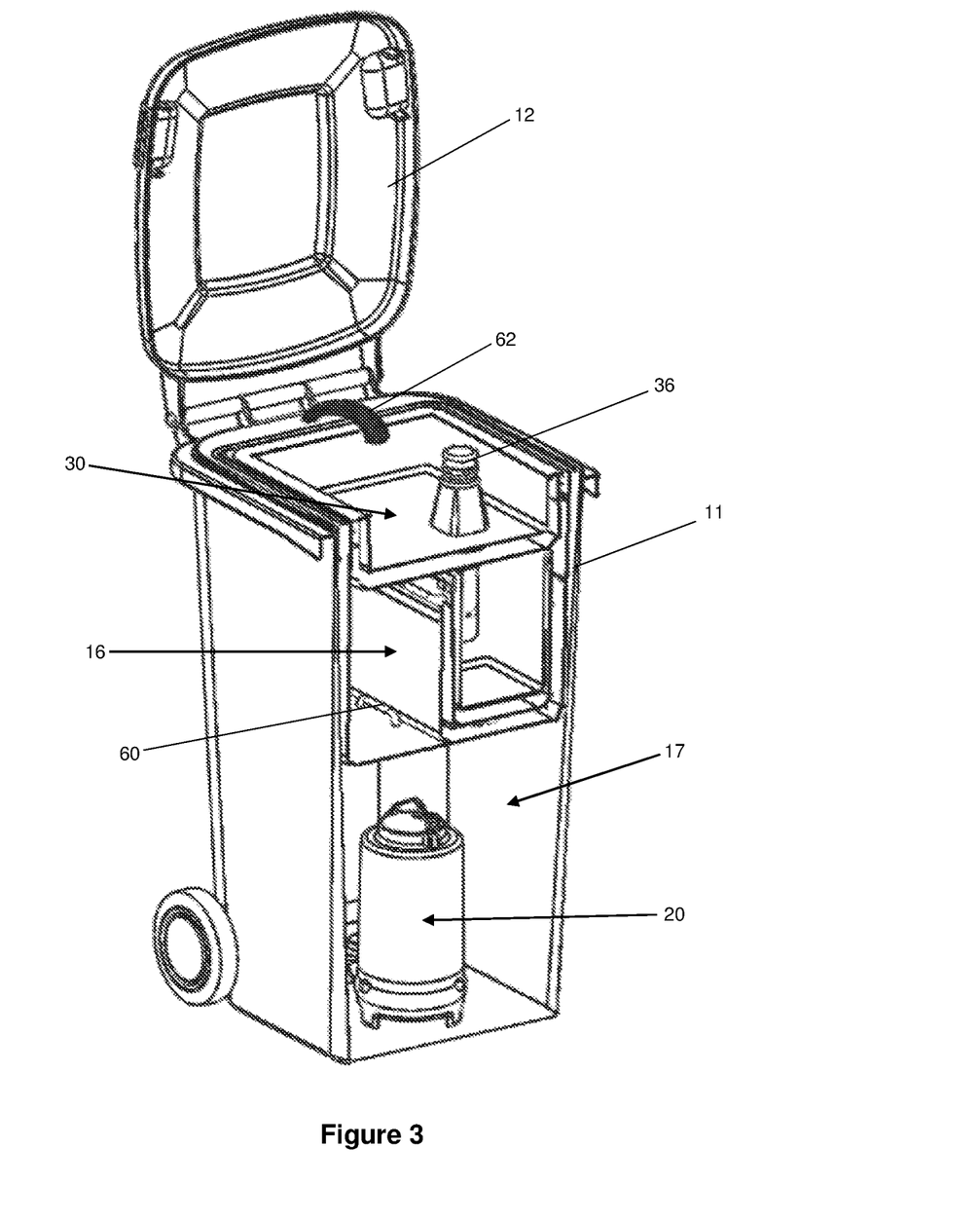
FIGS. 3 and 4 are alternate cut-away side views of the mobile sink assembly.
Figure 4:
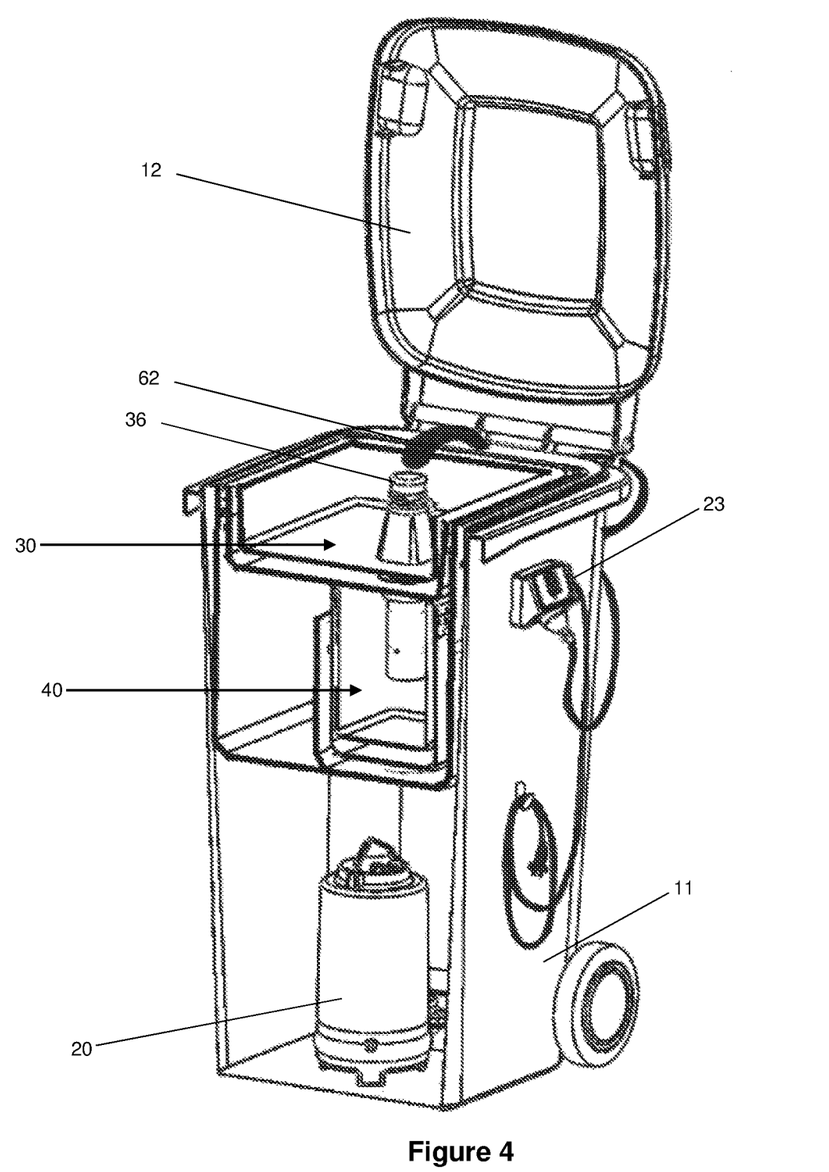
Figure 5:
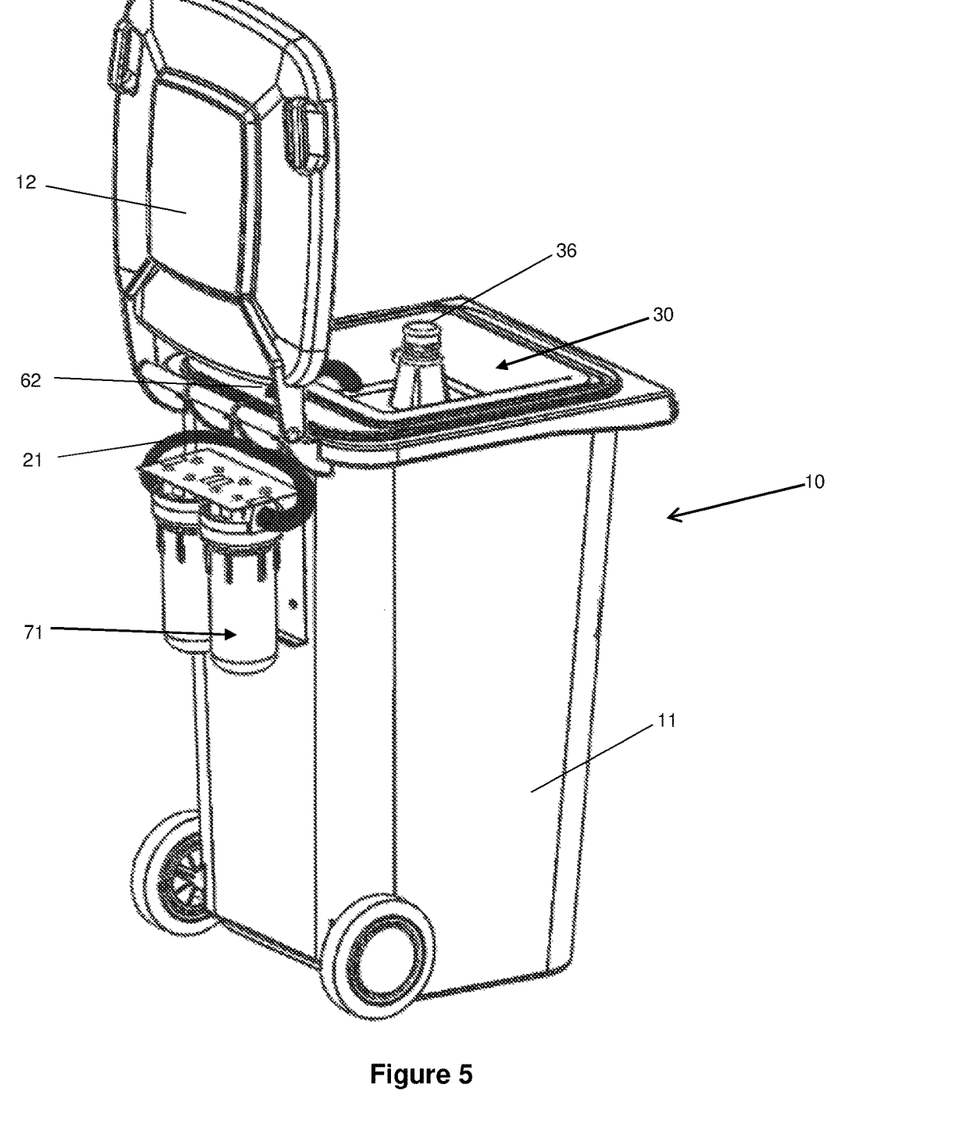
FIG. 5 is a diagrammatic rear side view of the mobile sink assembly.
Figure 6:
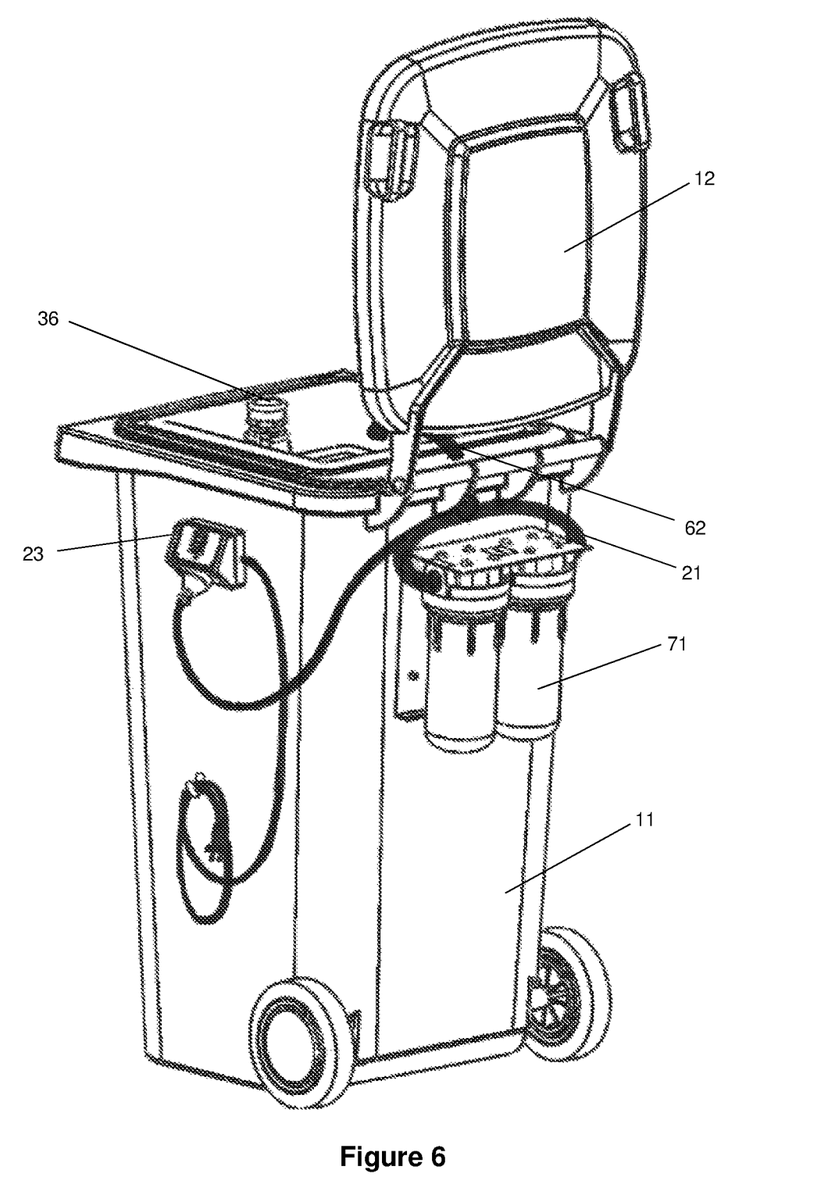
FIG. 6 is an alternate diagrammatic rear side view of the mobile sink assembly.
Figure 7:
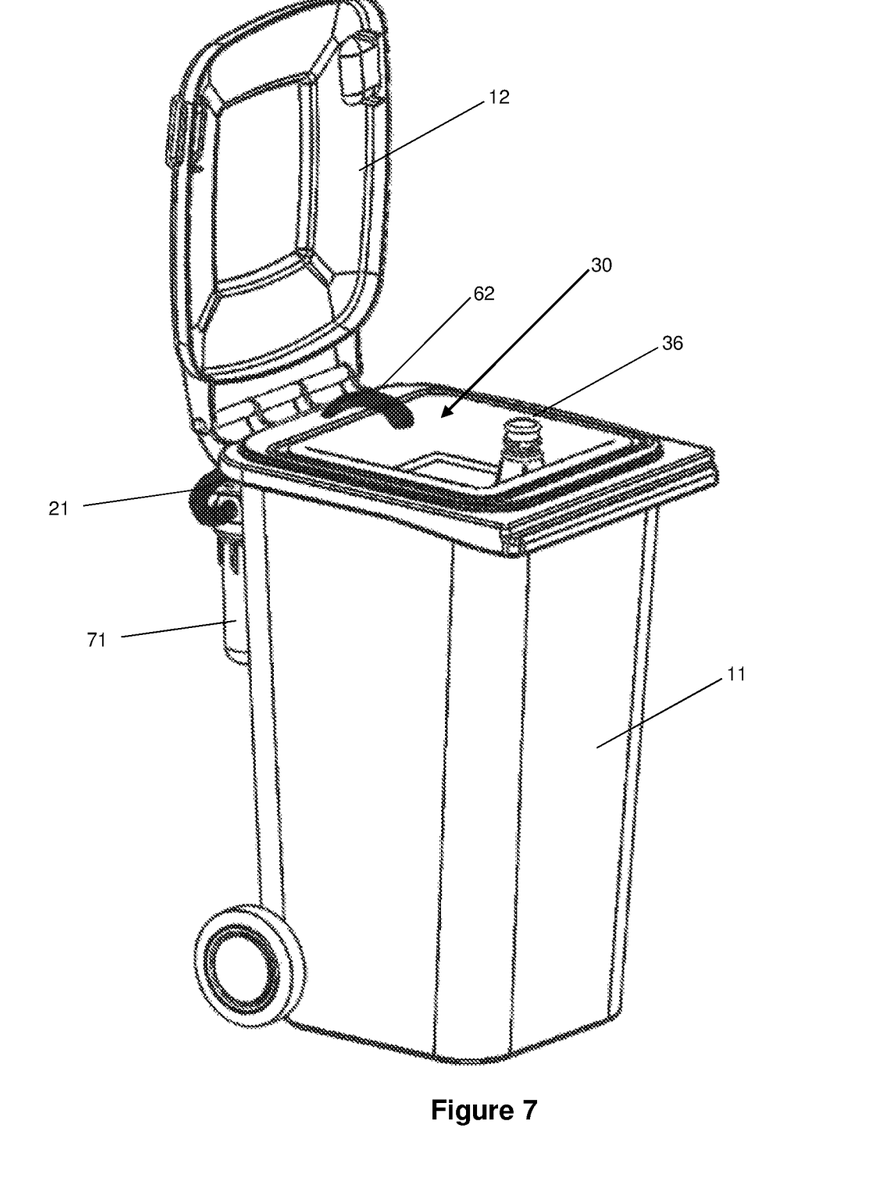
FIG. 7 is a diagrammatic front side view of the mobile sink assembly.
Figure 8:
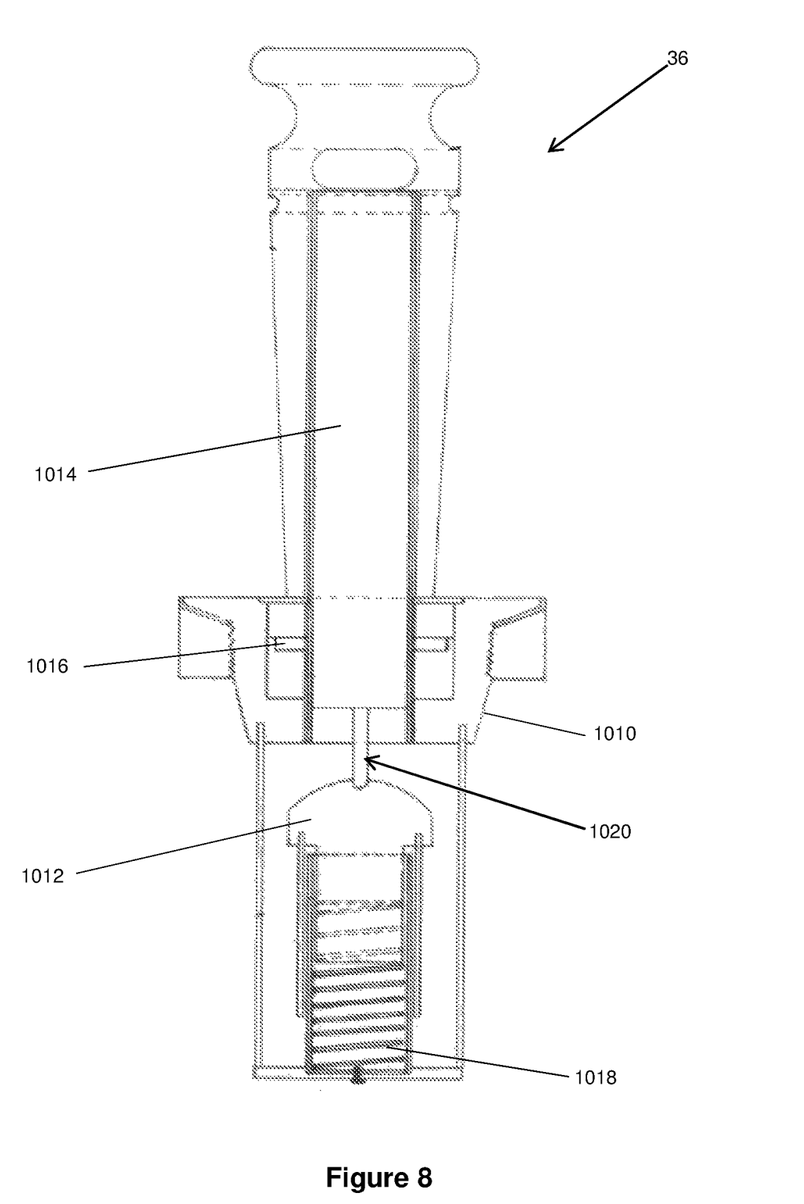
FIG. 8 is a schematic view of a valve assembly of the preferred embodiment with a riser in a lower position.

With reference to FIG. 8, there is shown a schematic view of a riser and valve assembly 36. The riser and valve assembly 36 has a mushroom valve 1012 which is positioned within the drainage aperture (not shown see item 35 of FIG. 1). The riser and valve assembly 36 has a riser 1014 which is movable with a fluid level in the second trap 40 between a lower position (shown) and an upper position (not shown). FIG. 8 is a schematic view and doesn't show the collar 1010 which connects to the drainage aperture 35 in the first trap 30 in the correct position.

The riser 1014 is removably coupled to the riser and valve assembly 36 by bayonet fitting 1016.

The riser and valve assembly 36 includes a valve biaser 1018 that is coupled to the mushroom valve 1012 and adapted to bias the mushroom valve 1012 towards the seated/sealed position (not shown). The mushroom valve 1012 is adapted to be actuated to the unsealed/unseated position (shown) by a valve actuator 1020 of the riser 1014.

Figure 9:
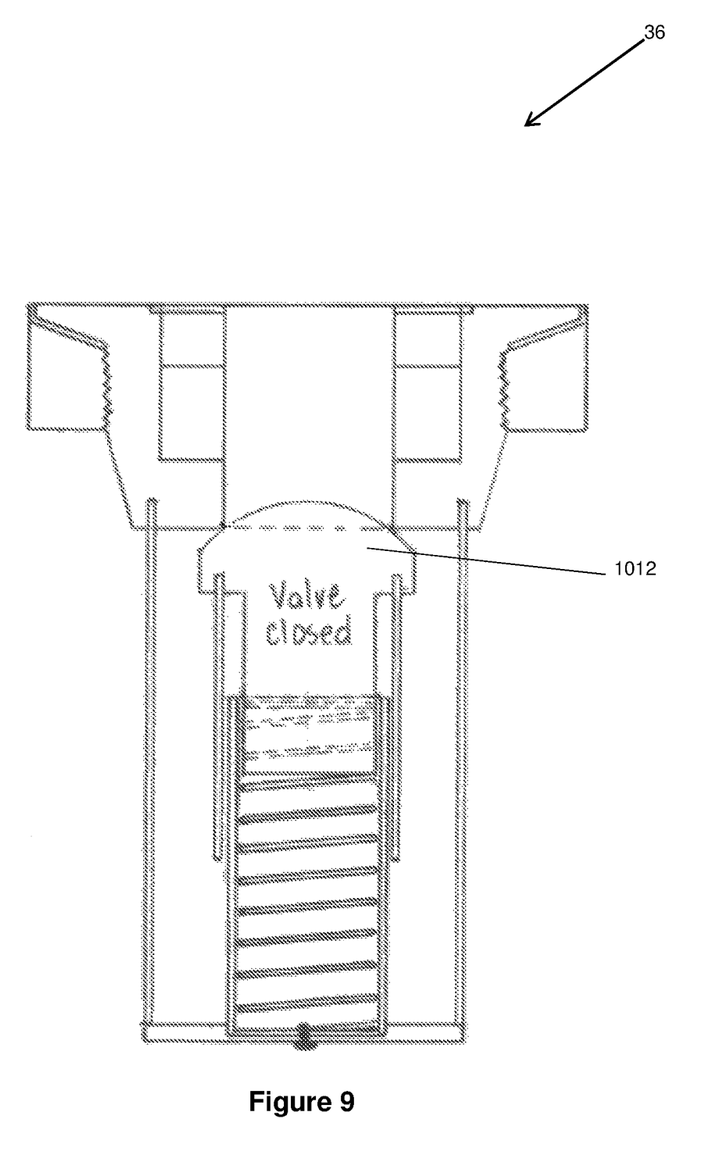
FIG. 9 is a partial schematic view of a valve assembly of the preferred embodiment with the mushroom valve in the seated position.

With reference to FIG. 9, there is shown a partial schematic view of a valve assembly 36 with the mushroom valve 1012 in the seated/sealed position.

Figure 10:
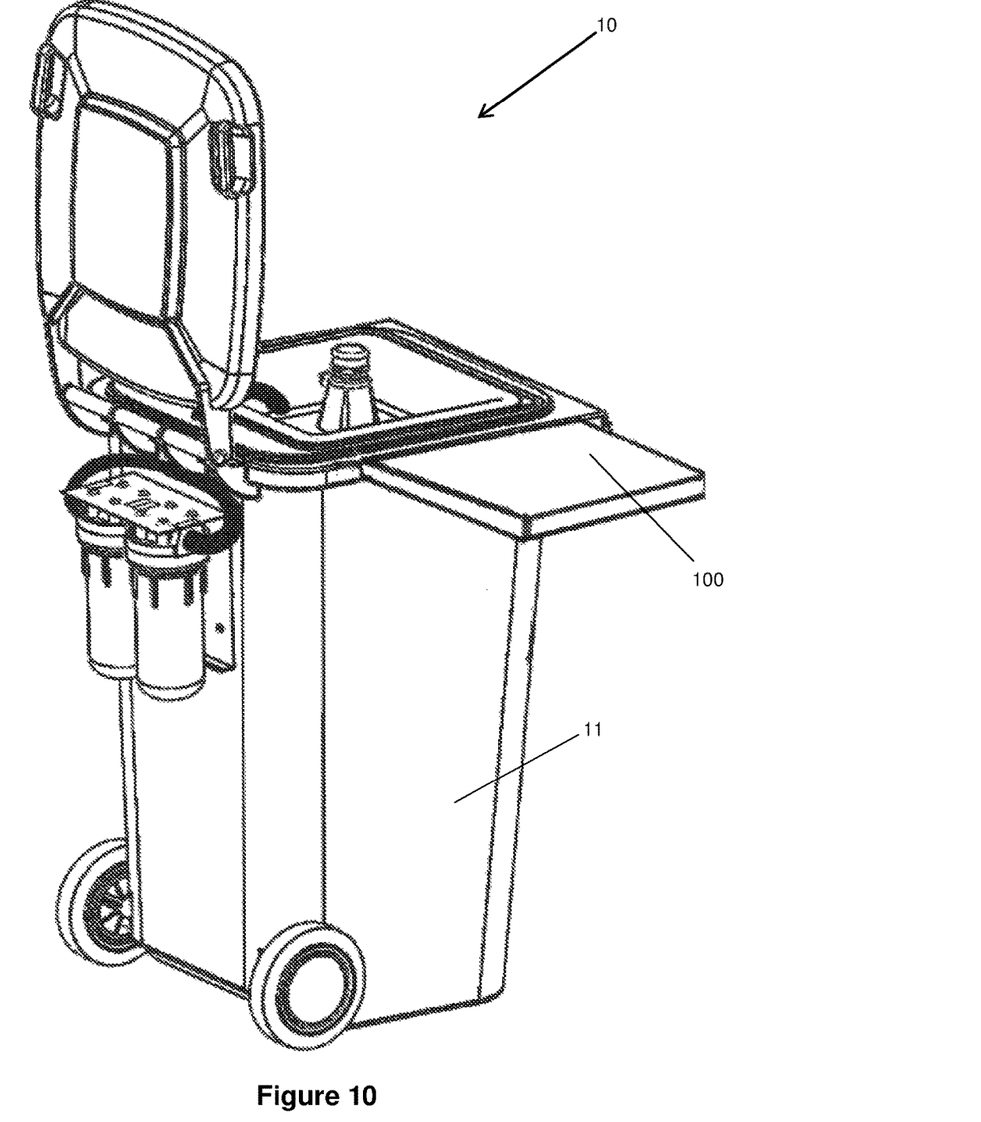
FIG. 10 is a diagrammatic view of the mobile sink assembly of the preferred embodiment with a work platform attached.

With reference to FIG. 10, there is shown a diagrammatic view of the mobile sink assembly 10 with a work platform 100 located adjacent a top of the container 11.

Advantages

The preferred embodiment of the present invention has the advantage that it can be wheeled and placed at any convenient site for on-site cleaning of tools and equipment used by tradespersons. The mobile sink assembly provides the advantage of convenience and ease in cleaning tools and equipment. The mobile sink assembly also provides an advantage where the waste is toxic and/or environmentally harmful in trapping it in a convenient manner and for easy disposal.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A mobile sink assembly including
    a container with one or more wheels, said container is partitioned into two compartments with an overflow aperture in a dividing wall providing fluid communication between an upper compartment and a lower compartment;
    a first trap mounted within the upper compartment and supported adjacent a top opening in the upper compartment by a rail a lip or a plurality of lugs surrounding an outer perimeter of the first trap, the rail, lip or plurality of lugs are positioned on a ledge, channel or protrusion on the inner surface of the upper compartment, said first trap has a draining aperture, said first trap has one or more discharge apertures on or near a top of the first trap where an overflow of fluid can discharge into the upper compartment;

a second trap positionable below the first trap and in fluid communication with the first trap via the draining aperture;

a third trap, said third trap contains the second trap positioned there-within, a riser and valve assembly coupled to the draining aperture in the first trap and configured to control a flow of liquid from the first trap into the second trap, the height of an opening in the riser and valve assembly is lower than the height of the top of the first trap to allow fluid to pass through the riser and valve rather than overflow the first trap, and a valve of the riser and valve assembly automatically closing off flow through the first trap draining aperture when an actuator portion of the riser and valve assembly is removed; and a pump operatively connected to pump fluid from the lower compartment to the first trap; wherein in use fluid is pumped from the lower compartment to the first trap, passes through the draining aperture into the second trap and from the second trap to the third trap and from the third trap via the overflow aperture to return to the lower compartment, while particulate matter is retained in the first and second traps.

2. A mobile sink assembly as claimed in claim 1, wherein the top of the first trap is positioned in use below a top of the container.

3. A mobile sink assembly as claimed in claim 1, wherein the draining aperture is positioned in a floor of the first trap.

4. A mobile sink assembly as claimed in claim 1, wherein one or more of the traps are each lined with a filter bag that collects the particulate matter.

5. A mobile sink assembly as claimed in claim 4, wherein the filter bag is a disposable filter bag.

6. A mobile sink assembly as claimed in claim 1, wherein there is a work platform located adjacent a top of the container.

7. A mobile sink assembly as claimed in claim 1, wherein the pump has a hose that extends from the pump to the first trap with a nozzle arrangement at an end remote from the pump; said nozzle arrangement includes a tap or valve to shut-off fluid flow.

8. A mobile sink assembly as claimed in claim 1, wherein the fluid is filtered while being pumped from the lower compartment to the first trap.

9. A mobile sink assembly as claimed in claim 8, wherein said filtering removes particulate matter using sieve filters with predetermined pore sizes.

10. A mobile sink assembly as claimed in claim 9, wherein the sieve filters are sand, clay or paper cartridge filters.

11. A mobile sink assembly as claimed in claim 1, wherein the riser and valve assembly includes a mushroom valve positioned within the draining aperture, the mushroom valve configured to actuate between a sealed position and an unsealed position, wherein in the sealed position the draining aperture is sealed to prevent draining of fluid from the first trap through to the second trap.

12. A mobile sink assembly as claimed in claim 11, wherein the riser and valve assembly includes a riser movable with a fluid level in the second trap between a lower position and an upper position, wherein in the upper position the riser actuates the mushroom valve in the sealed position.

13. A mobile sink assembly as claimed in claim 12, wherein the riser removably couples to the valve assembly by a bayonet coupling.

14. A mobile sink assembly as claimed in claim 12, wherein the riser and valve assembly includes a valve biaser that is coupled to the mushroom valve and adapted to bias the mushroom valve towards the sealed position.

15. A mobile sink assembly as claimed in claim 12, wherein the mushroom valve is adapted to be actuated to the unsealed position by the valve actuator of the riser.

16. A mobile sink assembly as claimed in claim 1, wherein the pump is a submersible pump within the lower compartment.

* * * * *